March 24, 1925.
C. E. DATH
CAR CONSTRUCTION
Filed Aug. 13, 1923
1,530,761
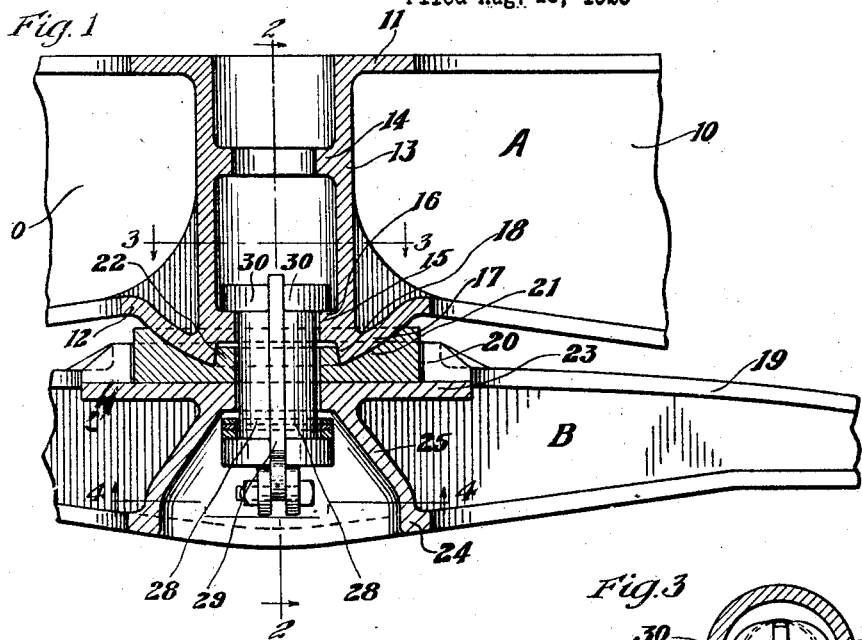
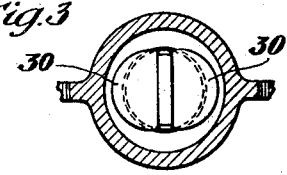
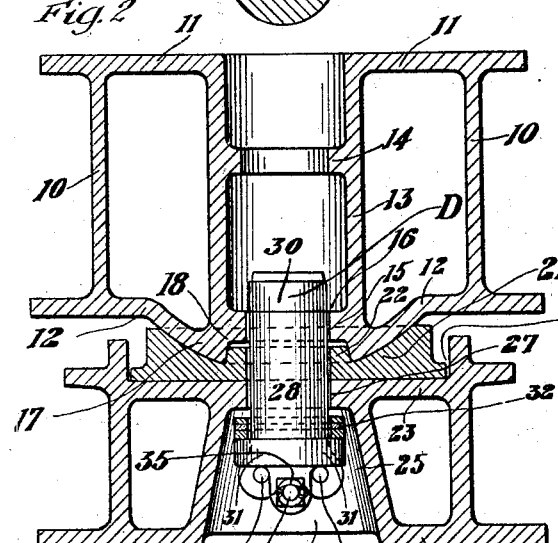
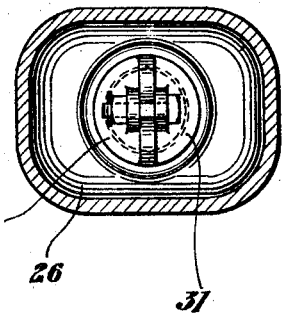
Witnesses
Wm. Geiger
Inventor
Charles E. Dath
By George I. Haight
His Atty.

Patented Mar. 24, 1925.

1,530,761

UNITED STATES PATENT OFFICE.

CHARLES E. DATH, OF CHICAGO, ILLINOIS, ASSIGNOR, BY MESNE ASSIGNMENTS, TO W. H. MINER, INC., A CORPORATION OF DELAWARE.

CAR CONSTRUCTION.

Application filed August 13, 1923. Serial No. 657,005.

*To all whom it may concern:*

Be it known that I, CHARLES E. DATH, a citizen of the United States, residing at Chicago, in the county of Cook and State of Illinois, have invented a certain new and useful Improvement in Car Constructions, of which the following is a full, clear, concise, and exact description, reference being had to the accompanying drawings, forming a part of this specification.

This invention relates to improvements in car construction.

In the operation of railroads, experience has demonstrated that it is highly advisable to so connect the body and truck bolsters of the car that they cannot separate vertically in event of collision or derailment, since this effectively prevents or minimizes turning over or telescoping of the cars. Locking pins are now extensively used to thus connect the bolsters, however, in the case of six-wheel trucks, particularly dining, buffet and baggage cars, much difficulty has been experienced, prior to my invention, in applying any suitable type of bolster locking device for the reason that the central axle of the six-wheel truck is located immediately below the pivotal center and it is impossible to obtain access from above the bolsters through the car floor on account of the fixtures of the car being located directly over the bolsters.

The object of my invention is to provide an improved car construction, particularly for six-wheel trucks, wherein provision is made for effectively interlocking the body and truck bolsters to prevent vertical separation, at the same time allowing of easy disconnection of the truck from the car to facilitate repairs and the like.

A more specific object of the invention is to provide an improved bolster and locking king pin arrangement for six-wheel trucks, wherein the king pin may be inserted from under the side of the truck bolster while the car body, including the body bolster, is assembled with the complete truck.

Other objects and advantages of the invention will more clearly appear from the description and claims hereinafter following.

In the drawing, forming a part of this specification, Figure 1 is a vertical, sectional view taken lengthwise of a car through the bolster connection and showing my improvements in connection therewith. Figure 2 is a vertical, sectional view corresponding substantially to the line 2—2 of Figure 1. And Figures 3 and 4 are horizontal, sectional views corresponding substantially to the lines 3—3 and 4—4, respectively, of Figure 1.

In said drawing, A designates the body bolster of a car, B the truck bolster and C the central axle of a six-wheel truck.

The body bolster A is of the cast type and has diaphragm sections 10—10, top and bottom walls 11 and 12, and a center section 13 to accommodate the king pin D. Said section 13, as shown, is of cylindrical tubular form throughout its length. Intermediate the top and bottom, said section 13 is provided with a transversely extending portion 14, which is centrally apertured. At its bottom, the section 13 is provided with a bottom wall 15 apertured centrally, thereby providing an upper annular shoulder 16, the aperture being adapted to accommodate the king pin D. The bolster A is also provided with a rounded central bearing section 17 integral therewith and forming a continuation of the web 12. As clearly shown in Figures 1 and 2, the wall 15 is offset upwardly with reference to the bottom face of the bearing section 17, thereby providing a female socket 18.

The truck bolster B, also a casting, is of arched spider form, preferably, comprising four arms 19 extending more or less radially from the center of the casting, portions of two of said arms being shown. The bolster casting B, as shown, is formed at the center of the top thereof with a seat 20 adapted to accommodate a center bearing plate 21 having the top face thereof conforming to, and adapted to cooperate with, the underface of the center bearing section 17. The plate 21 is also provided with an upstanding annular flange 22 adapted to extend into the recess 18 and is centrally apertured to accommodate the king pin D, said aperture being axially alined with the aperture in the wall 15. The central portion of the bolster casting B is provided with upper and lower webs 23 and 24 and a central section in the form of a pocket 25 open at the bottom and having downwardly flaring walls. The upper portion of the pocket is of substantially circular cross-section as clearly shown in Figure 4, and the same gradually merging into a mouth 26 of generally rectangular outline, as most clearly shown in Figure 4, being of considerable greater extent longitudinally than transversely of the car, to thereby facilitate the insertion of the locking center pin at an inclination so as to clear the central axle C of the truck, as more fully explained hereinafter. As clearly shown in Figures 1 and 2, the upper web is provided with an opening 27 in axial alinement with the openings in the center bearing section 21 and the wall 15, adapted to accommodate the king pin. The upper circular portion of the pocket 25 is of greater diameter than the opening 27 thereby providing ample space to accommodate the enlarged lower end portion of the locking pin D.

The body bolster A is interlocked with the truck bolster by the following described locking pin. As shown, the king pin D comprises two substantially semi-cylindrical outer sections 28—28 and a central spreader plate 29. Each of the outer sections 28 is formed at the top thereof with eccentric, substantially semi-cylindrical, outwardly extending flanges 30, which overlap the shoulder 16. At the bottom, each section 28 is formed with a concentric, substantially semi-cylindrical flange 31 adapted to form a supporting shoulder for a plurality of shims or washers 32 which may be interposed between the same and the lower face of the web 23. Each of the sections 28 is also provided with a downwardly extending perforated lug at the lower end thereof. The lugs on the sections 28 are so disposed as to have the perforations thereof in axial alinement when the parts of the pin are assembled, so as to receive a transversely extending retaining bolt 34. The cross-sections of the members 28 are such that they may be inserted from the bottom, through the king pin openings when the plate 29 is not present; the eccentric flanges being adapted to pass freely through said openings. After having been inserted, the plate 29 is interposed between the sections 28 thus separating the sections and causing the same to interlock with the bolsters. The major portion of the spreader plate 29 is of a width corresponding to the diameter of the semi-cylindrical sections 28 and the entire plate is of such a length that it projects slightly above the upper end of the section 28 and extends an appreciable distance beyond the lower ends thereof. The lower end portion of the plate 29 is flared laterally as shown in Figure 2 and is provided with a central notch 35 in its lower edge, within which the shank of the bolt 34 is adapted to engage. It will be evident that when the parts are in assembled relation, with the bolt 34 in position, the plate 29 will be positively held against downward movement by engagement with the bolt. To facilitate removal of the plate 29 from between the plates 28 the flaring portion of the former may be provided with perforations 36 within which a hook or other suitable tool may be engaged to pull the plate out.

From the preceding description, it will be evident that all of the parts of the interlocking center pin may be placed in proper position from the under side of the truck bolster when the latter is in assembled relation with the car body, thus overcoming the difficulties heretofore inherent in those types of cars employing six-wheel trucks and wherein access to the center bearing was impossible from above the bolsters. In applying the center pin, one section 28 is first inserted within the mouth of the flaring recess in the truck bolster at an angle to the vertical and from the front or rear side of the central axle. Said section 28 is then passed through the alined openings of the bolsters and center bearing plates; the shims, if any are to be applied, are then passed over the flange on the lower end of said section 28 which is in place; the other section 28 then is inserted through the openings of the ring shims and up into vertical position in a manner similar to that employed for entering the first section 28; and finally the spreader plate 29 is inserted and the parts held in assembled relation by the bolt 34.

With my arrangement, it is unnecessary to provide any detachable blocks or castings to form parts of either of the bolsters; the truck bolster or spider B need not be detached or separated from other parts of the truck, both of which expedients have heretofore been employed in similar constructions; and the sectional interlocking center pin can be employed, in my construction, substantially as easily as in a four-wheel truck construction, all without any extra expense.

I have herein shown and described what I now consider the preferred manner of carrying out my invention, but the same is merely illustrative and I contemplate all changes and modifications that come within the scope of the claims appended hereto.

I claim:

1. In car construction, the combination with a body bolster, of a six-wheel truck including a truck bolster and axle located below the center of the bolster, said bolsters having alined openings above said axle, adapted to receive a king pin, and said truck bolster being provided with a downwardly flaring pocket communicating with the king pin receiving opening thereof.

2. In car construction, the combination with a body bolster; of a truck bolster for six-wheel trucks having an axle located below the center of the bolster; cooperating bearing portions on said bolsters, said bearing portions being centrally perforated to accommodate a king pin for locking the bolsters together, said truck bolsters being cut away adjacent the pin receiving perforation thereof, to permit inclining of the pin during insertion of the same into said perforations.

3. In car construction, the combination with a body bolster; of a six-wheel truck including a truck bolster and an axle located below the center of the bolster, said bolsters having alined king pin receiving openings provided with shoulders, the opening in said truck bolster being provided with a downwardly flaring mouth; and a locking pin adapted to be inserted through said mouth while inclined so as to clear said axle, said pin having flanges adapted to coact with said shoulders to retain the same in locking relation with said bolster.

4. In a locking king pin for truck and body bolsters of railroad cars, the combination with a pair of semi-cylindrical side elements, said elements having eccentric, laterally projecting flanges at their upper ends and concentric, laterally projecting flanges at their lower ends; of a spreader plate adapted for insertion between said elements.

5. In a locking pin for truck and body bolsters, the combination with a pair of semi-cylindrical side elements and laterally projecting flanges at the upper ends thereof and downwardly projecting perforated lugs at the lower ends thereof; of a spreader plate adapted to be inserted between said elements, said plate being provided with a notched lower edge; and a retainer bolt extending through said lugs and coacting with said notched portion to prevent said parts from becoming separated when assembled with the bolsters.

6. In car construction, the combination with a body bolster having a central bearing portion thereon; said bearing portion being perforated to receive a locking pin, said bolster having also an annular shoulder immediately adjacent said bearing portion; of a truck bolster for six-wheel trucks having an axle located below the center of the bolster, said truck bolster being also provided with an enlarged pocket, a bearing portion adapted to cooperate with said first named bearing portion, and a horizontal wall immediately adjacent said last named bearing portion and spaced from said axle, said wall being perforated to receive the king pin; and an expansible locking king pin having flanges at the upper end thereof adapted to cooperate with the shoulders of said body bolster, said pin being of such a length as to extend entirely through said perforated portions, but of less length than the distance between the said horizontal wall and axle.

7. In car construction, the combination with a body bolster, and a six-wheel truck, including a truck bolster and an axle located below the center of the bolster, said bolsters having alined central openings; of a sectional, locking king pin extending through said openings and adapted to lock said bolsters together, said pin sections having laterally projecting flanges at the ends, only the upper flanges being insertable into said openings, whereby said sections may be inserted upwardly into said openings and locked in place from the bottom side of the truck.

8. In car construction, the combination with a body bolster; of a six-wheel truck including a truck bolster having the center thereof disposed above the central axle of the truck, said bolsters having cooperating center bearing sections and alined king pin openings, the truck bolster having a recess on the under-side thereof communicating with the king pin opening therein, said recess flaring to a point one side of the central axle; and a locking center pin inserted from the bottom side of said truck bolster through said recess.

In witness that I claim the foregoing I have hereunto subscribed my name this 4th day of August 1923.

CHARLES E. DATH.

Witnesses:
FRANCES SAVAGE,
HARRIETTE M. DEAMER.